United States Patent [19]
Pringault

[11] Patent Number: 5,097,579
[45] Date of Patent: Mar. 24, 1992

[54] AUTOMATIC DEVICE FOR THE PUTTING IN PLACE OF VALVES

[75] Inventor: Marc Pringault, Gentilly, France

[73] Assignee: Constructions Mecaniques de la Guide, France

[21] Appl. No.: 600,450

[22] Filed: Oct. 19, 1990

[30] Foreign Application Priority Data

Oct. 19, 1989 [FR] France ............................... 89 13801

[51] Int. Cl.⁵ ............................................. B23P 19/04
[52] U.S. Cl. ...................................................... 29/214
[58] Field of Search .................. 279/66, 35; 29/213.1, 29/214, 255, 263, 261, 262, 280, 282, 252; 254/18

[56] References Cited

U.S. PATENT DOCUMENTS

| | | | |
|---|---|---|---|
| 2,467,982 | 4/1949 | Maris ..................... | 29/214 |
| 2,706,103 | 4/1955 | Stambaugh et al. ................. | 254/19 |
| 2,843,388 | 7/1958 | Butler ..................... | 279/66 |
| 3,568,292 | 3/1971 | Kasper . | |
| 3,962,770 | 6/1976 | Dooley et al. ......................... | 29/282 |

FOREIGN PATENT DOCUMENTS 158088 10/1985 European Pat. Off. .
1471553 4/1977 United Kingdom .

Primary Examiner—Robert C. Watson
Attorney, Agent, or Firm—Ostrolenk, Faber, Gerb & Soffen

[57] ABSTRACT

This automatic device for the putting in place of the valves of an internal combustion engine serves to insert half cones in a collar on the valve stem. Within a housing provided with a cover it comprises:

a central slide displaceable in the direction indicated by the arrow A between a withdrawn position and a position of presentation of the double cones arranged on each side of the slide;

a pair of jaws sliding on shafts, which jaws are spread apart when the slide is in presentation position, each jaw receiving a lever adapted to hold a half cone in its lower part and to push it towards the inside; and push means cooperating with the collar in order to compress the valve spring in synchronism with the movement of the slide.

This device operates whatever the inclination of the valve. Due to their small overall dimension, several devices can be placed alongside of each other.

21 Claims, 2 Drawing Sheets

AUTOMATIC DEVICE FOR THE PUTTING IN PLACE OF VALVES

The present invention lies within the field of mechanics and concerns, more particularly, equipment for the automatic putting in place of the valves of an internal combustion engine.

The valves are to be placed in the cylinder head and have a valve stem which protrudes to the outside and around which a valve spring is arranged, the spring resting on one side against the cylinder head and on the other side against a collar fastened on the valve stem by means of a pair of elements forming a conical frustum, commonly known as half cones, arranged on the face of the collar opposite the spring. The half cones have one or more inner ribs intended to cooperate with one or more grooves present on the end of the valve stem.

At present, equipment for the placing of half cones in the grooves of valves operates by the use of gravity or pneumatic suction.

The major drawbacks encountered in the equipment which up to now effects this type of installation are substantial damage to the half cones and the valve stems and, above all, the necessity of orienting the cylinder head so as to present the valve stems along a precisely vertical axis.

The present invention is directed at overcoming these drawbacks and it has as its object an automatic device for the putting in place of valves, having one or more grooves and a vertical or inclined axis, of an internal combustion engine by means of half cones inserted in a collar on the valve stem on the side opposite the valve spring, this device having push means which are adapted to cooperate with the collar in order to maintain said spring in a predetermined position of compression.

This device is characterized by the fact that it comprises:

a pair of jaws which are displaceable along an axis B which is substantially perpendicular to the valve stem and are adapted, at least indirectly, to hold said half cones, whatever the inclination of the valve stem with respect to the vertical; and a central slide which is displaceable substantially along the axis of the valve stem between an unadjusted position of presentation of the half cones and an unadjusted position of withdrawal of the slide, the said central slide having means for controlling the opposite displacement of each jaw along the axis B upon the displacement of the slide, and the end part of said slide being intended to hold the half cones apart in position of presentation.

In a preferred embodiment, each jaw is mounted on ball bearings which slide on two shafts parallel to the axis B and is subjected to the push of a spring acting in the direction opposite said opposite displacement. Each jaw receives in its lower part an articulated lever, the end of which has means for grasping a half cone. A traction spring is arranged between the pair of levers in order to bring them together.

The jaws, the slide and the push means are contained within a housing formed by a bottom with two wings and provided with a cover symmetrical to the bottom. The wings have openings for the attachment of shafts on which the jaws can slide, while both the bottom of the housing and its cover have a central extension intended to receive the valve spring compression means.

The slide constitutes the main part of the device since, depending on its position, it makes it possible to control the displacement of the jaws and the release of the half cones on the grooves of the valve stem. For this purpose, it has two opposite faces, each of which has an inclined flat intended to cooperate with a cylindrical body protruding on the facing faces of each jaw, so that the jaws move apart from each other in position of presentation of the half cones and move towards each other when the slide is withdrawn. Furthermore, the end portion of the slide intended to hold the half cones apart in presentation position is formed of the tines of a fork which extend along a central recess adapted to receive the valve stem, while the tines have, towards the outside, a recess adapted to cooperate with the central opening of the collar.

The slide furthermore has a transverse pin and is adapted to pivot on the axis of the latter in order to assure parallelism with the valve stem, the ends of the pin sliding in an internal guide groove provided in the inner face of each central extension upon the displacement of the slide.

The push means are formed of two cylindrical rods intended to slide in the openings provided in the extensions of the bottom of the housing and its cover, each rod being provided at one end with a block adapted to cooperate with drive means for movement in opposition to a spring and, at the other end, with an arcuate part intended to rest against the compression collar of the valve spring.

The movements of the slide and of the push means can be affected automatically by means of hydraulic cylinder-piston units the control of which is programmed in a management unit which assures the succession of the operations.

The accompanying drawing shows, by way of illustration and not of limitation, one embodiment of the device mounted in the equipment in accordance with the invention.

Figures 1, 2, 3:
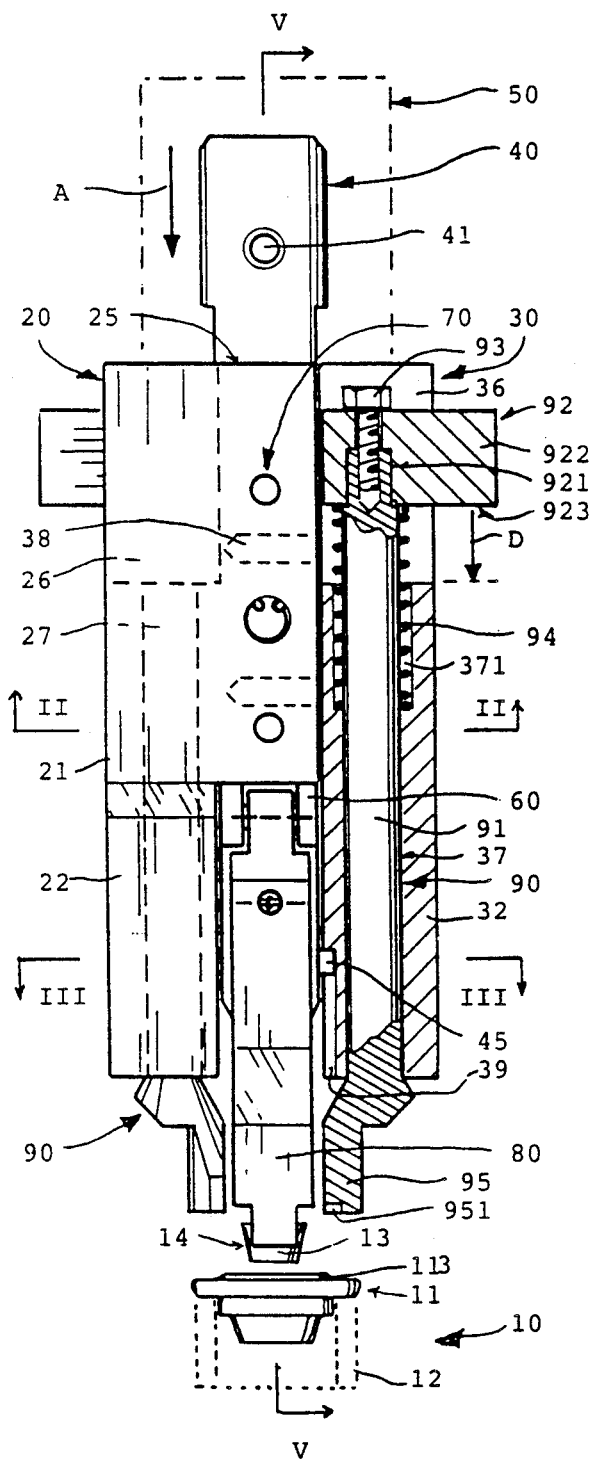
FIG. 1 is a side view of the device with partial section through one of the push devices of the valve spring, the central slide being in retracted position.
FIG. 2 is a cross section along the line II—II of FIG. 1.
FIG. 3 is a cross section along the line III—III of FIG. 1.

The device in accordance with the invention is shown in FIG. 1 in its operating position above a cylinder head (not shown) in which there is to be fastened a valve 10, indicated diagrammatically by the clamping collar 11 of the valve spring 12, indicated in dashed line. The collar 11 is intended to receive a pair of half cones 13 and 14 in a frustoconical opening 111 (shown in FIG. 5). For clarity of the drawing, the collar 11 is shown separated from the device, as is furthermore the valve stem 15 of FIG. 4.

In the drawing there can be noted a valve stem having three ribs 151 and half cones 13 and 14 having three curves (FIG. 5), but it goes without saying that the device can also be used for half cones having a different configuration, for instance single-groove elements.

The device is mounted in a housing 20 provided with a side cover 30 in the center of which parts there is mounted a central slide 40 for the moving apart of the half cones, it being subject to the action of a piston 50, shown in dot-dash line. The housing also contains a clamp 60 with two jaws, which are mounted for sliding, in a plane substantially perpendicular to the valve stem, on guide means 70. Each jaw has a lever 80 at its lower end. The assembly is supplemented by a push device 90 intended to assure the compressing of the valve spring 12.

Figures 4, 5:
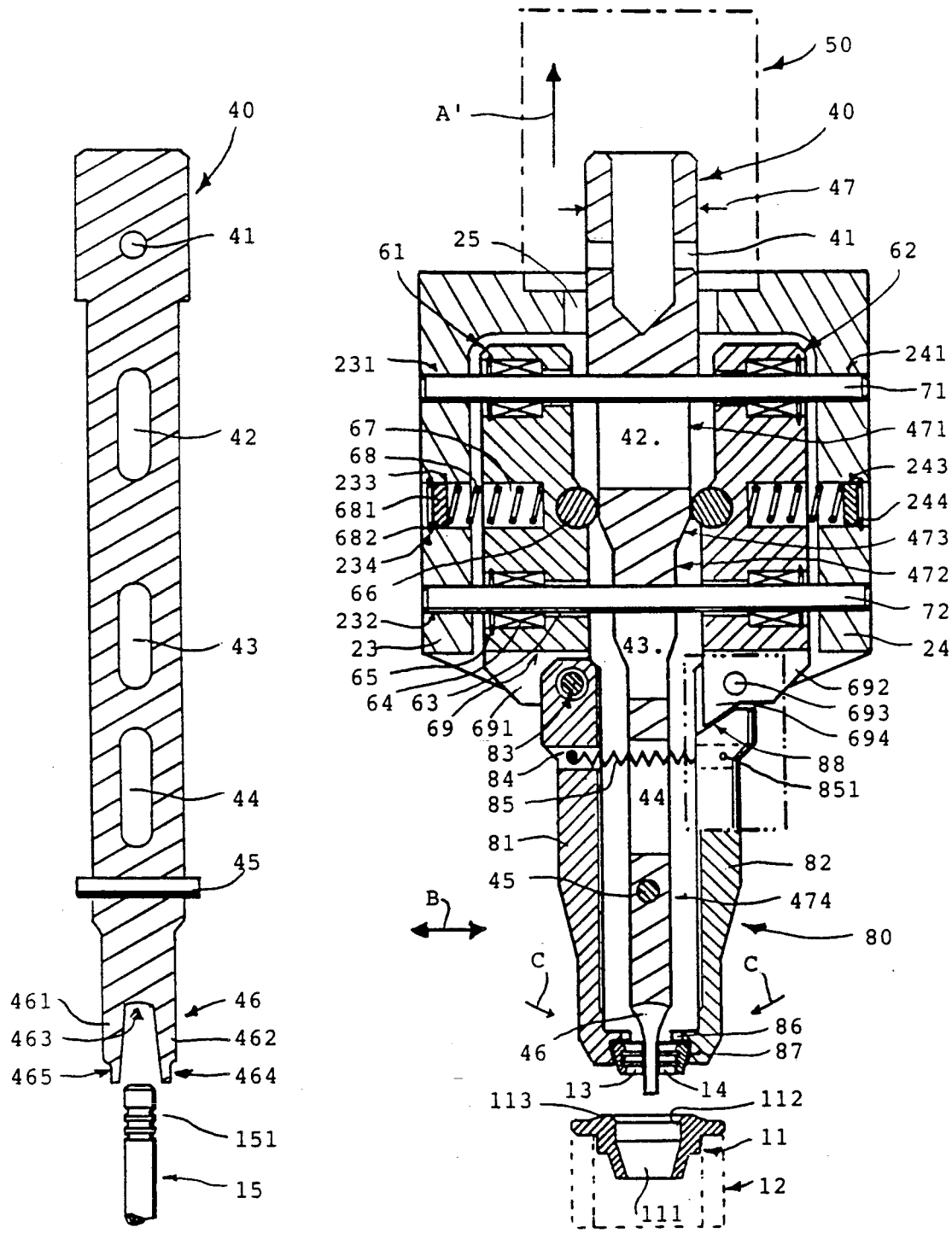
FIG. 4 is a longitudinal section through the central slide for the spacing of the half cones, seen in the plane of FIG. 1.
FIG. 5 is a longitudinal section through the device along the line V—V of FIG. 1, with partial side view, the central slide being in the position of separation of the double cones.

The housing 20 has, more precisely, a bottom 21 which presents in downward direction a central extension 22, and two side wings 23 and 24, visible in FIGS. 2 and 5. In said latter figure, it will be noted that each of the side wings 23 and 24 has two openings 231, 241 and 232, 242 intended for the fastening of two parallel shafts 71 and 72 constituting the guide means 70. The side wings 23 and 24 furthermore also have a recess 233 and 243 provided with a groove 234 and 244, the purpose of which will be indicated further below.

In its upper part, the housing 20 has a central opening 25 for the passage of the central slide 40 and a lateral recess 26 extended by a continuous opening 27 for the passage of the push device 90.

The housing 20 is furthermore provided with means for attachment to a moveable part of the transfer machine, not shown in the drawing.

The cover 30 is formed symmetrically to the bottom 21 of the housing. It therefore has a plate 31 presenting towards the bottom a central extension 32 and a lateral recess 36 extended by a continuous opening 37 for the passage of the push device 90. The cover 30 is fastened to the housing 20 by screws 38. One may also provide guide elements for the cover with respect to the housing, developed in conventional manner and not shown in the drawing.

Each central extension 22 or 32 furthermore has a vertical inner guide groove 29 or 39 (FIG. 3), the purpose of which will be indicated further below.

The central slide 40 for the moving apart of the half cones is provided in its upper part with a radial passage 41 for the fastening of the piston 50 intended to displace the slide in the direction indicated by the arrow A, or in the opposite direction.

In the showing of FIG. 4, it will be noted that the central slide 40 has two oblong openings 42 and 43 providing free passage for the shafts 71 and 72, as well as a third oblong opening 44 the purpose of which will be mentioned further below. The slide is traversed by a guide pin 45 the ends of which are adapted to slide in vertical grooves 29 and 39 of the extensions 22 and 32 of the housing 20 and of its cover 30 (see FIG. 3). The lower end of the slide forms a fork 46, between the tines 461 and 462 of which a cutout 463 permits the introduction of the stem 15 of the valve 10. The tines 461 and 462 have, towards the outside, a recess 464, 465 such that the fork 46 can be introduced into the central opening 112 of the collar 11.

In the part thereof arranged within the housing 10, the slide 40 is of rectangular cross section and, as can be noted from the longitudinal section of FIG. 5, its width 47 decreases from top to bottom. The passage from the upper part 471 to the central part 472 is affected via two symmetrical inclined surfaces 473. Its lower part 474 is furthermore narrowed with respect to the central part 472 while the fork 46 has a width such that, in the position of presentation of the half cones of FIG. 5, the valve stem can be introduced between the tines of the fork 46.

It is to be noted that the slide 40 is mounted with clearance with respect to the housing 20 the central opening 25 of which is of a dimension greater than the width 47 of the slide so that angular displacement with respect to the axis 45 is possible, as will be seen below.

The clamp 60 is clearly visible in FIG. 5. It is formed by two symmetrical jaws 61 and 62 intended to slide on the parallel shafts 71 and 72 passing through openings 63. In order to facilitate this displacement, each opening has a ball ring 64 held in a corresponding recess by a clip 65.

A cylindrical portion 66 is fastened on the side of each jaw 61 and 62 by any means known to the person skilled in the art, protruding towards the inside, and it is intended to cooperate with the upper part 471 and the central part 472 of the slide 40, as well as with the inclined flat 473 which connects them.

Each jaw 61 or 62 furthermore has a cutout 67 intended to receive a compression spring 68, one end of which rests against the bottom of the cutout 67 while the other passes into the opening 233 or 243 of the wings 23 or 24 of the housing, where it is held by a plate 681 fastened by a clip 682 inserted into the corresponding groove 234 or 244. The springs 67 urge the jaws 61 and 62 forming the clamp 60 towards each other.

In its lower part, each jaw 61 or 62 has a cutout 69 edged by two wings 691 and 692 having a hole intended to receive a pin 693 for the fastening of the lever 80.

When the central slide 40 moves in the direction indicated by the arrow A or in the opposite direction, the jaws of the clamp 60 and therefore the levers 80 are moved in the direction of the arrow B or in the opposite direction.

Furthermore, if the slide is displaced angularly with respect to the shaft 45 of FIG. 5, it drives to the right or the left the assembly formed of the jaws 61 and 62 and their levers 81 and 82, which move along parallel shafts 71 and 72.

The levers 81 and 82 are symmetrical and are rigidly attached to the jaws 61 and 62 respectively. The constitute the grasping means of the half cones which are to be put in place. Each lever 81 or 82 has, in its upper part, a passage 83 for the pin 693 on which it is articulated with respect to the jaw 61 or 62. In its central part, each lever 81 or 82 has a transverse passage 84 permitting the housing of a tension spring 85 fastened between the levers 81 and 82 by pins 851. At the lower end of the levers, there is a shoulder 86 and internal cutout 87 of shapes corresponding to the shape of the half cone 13 or 14.

The purpose of the spring 85 is to move the levers 81 and 82 together, as indicated by the arrows C. It passes through the central slide 40 within the oblong opening 44 which was previously mentioned.

In the part of FIG. 5 showing the side view of the connection of the jaw 62 to the lever 82, there can be noted the special shape imparted the end 694 of the wings of the jaw, which has a flat intended to serve as stop for the rim 88 of the lever 82, which thus remains substantially parallel to the central axis of the assembly.

The push device 90, intended to assure the compressing of the valve spring 12, comprises, as can be noted from FIG. 1 in the part shown in section, a cylindrical rod 91 intended to slide in the opening 37.

In its upper part, the rod 91 is made integral with a parallel piped block 92 by means of a screw 93. In order to avoid rotation of the rod 91, the block 92 has an opening 921 which has a flat. The block 92 has a protrusion 922 towards the outside and can be actuated in the direction of the arrow D by a device not shown in the drawing, in order to come against the bottom of the lateral cutout 36, compressing a spring 94 intended to bring the push device into the position shown in FIG. 1. The spring 94 is arranged between the lower face 923 of the block 92 and the bottom of a housing 371 provided at the entrance to the opening 37.

In its lower part, the rod 91 is terminated by an arcuate part 95 intended to rest against the clamping collar 11 of the valve spring 12. A cutout 951 is provided for the passage of the upper rim 113 of the collar.

As a variant, the part resting against the collar in order to compress the valve spring could be arranged between the central slide and the jaws and their levers.

Summarizing, the movements of the device described above are as follows:
1. a vertical displacement of the central slide 40 in the direction indicated by the arrow A (FIG. 1) or in the opposite direction in accordance with the arrow A' (FIG. 5), under the action of the piston 50;
2. an opposite lateral displacement of the jaws 61 and 62 and their levers 81 and 82 in the direction indicated by the arrow B (FIG. 5) or in the opposite direction, obtained by the rolling of the cylindrical portions 66 on the upper part 471 or central part 472 of the central slide 47, as well as on the symmetrical inclined flats 473;
3. a rotation of the levers 81 and 82 on their pin 693 which fastens them to the jaws 61 and 62, as indicated by the arrows C (FIG. 5);
4. a vertical displacement of the push devices 90 in the direction indicated by the arrow D (FIG. 1) by a device not shown in the drawing;
5. an angular displacement of the central slide 40 on the shaft of the pin 45 when the fork 46 penetrates into the collar 11, which angular displacement causes a lateral displacement of the jaws 61 and 62 and of their levers 81 and 82 along the shafts 71 and 72.

Furthermore, the entire device described can be displaced with respect to the console of the transfer chain where it is mounted.

The device described can be used alone, or preferably several assemblies can be combined, for instance four, in order, in one operation, to equip a cylinder head with four of its valves in a machine passed through by a conveyor.

The device or devices are raised to permit the placing in position of the half cones 13 and 14, which are brought into compartments of a carriage below the device, while the central slide is in the low position shown in FIG. 5. The half cones are then positioned on both sides of the fork 46, resting against the shoulder 86 and the internal cutout 87 of the levers 81 and 82. No adjustment need be affected at the level of the clamp 60 or the levers 81 and 82, the value of the distance apart being established by the thickness of the fork 46, which is so selected that the valve stem 15 can penetrate between the half cones into the cutout 463 formed between the tines 461 and 462 of the fork. The carriage for the presenting of the half cones is then moved away.

The assembly is then lowered towards the cylinder head to be equipped, in which the valves are put in place in a manner known to the person skilled in the art, the collar 11 and the spring 12 being arranged below the device, as shown in FIG. 1.

The pushing device 90, which is intended to assure the compressing of the valve spring 12, is adjusted, by positioning of the blocks 92, in such a manner that the arcuate portions 95 are in contact with the collar 11 and compress the spring 12, while the valve stem 15 enters between the half cones, which are spaced apart by the fork 46, into the cutout 463. The vertical stroke of the push device is regulated in such a manner that the half cones face their respective grooves on the valve stem.

Under the action of piston 50, the slide 40 is then withdrawn upwards and the half cones 13 and 14 are placed on the grooves 151 of the valve stem 15 under the action of the spring 85.

The entire device is raised vertically, resulting in the raising of the collar 11 under the action of the valve spring 12 so that the half cones are housed within the internal cutout 111 of the collar. At the end of the upward stroke of the assembly, the cylinder-piston unit lowers the central slide 40 into the position shown in FIG. 5 and a new cycle can take place.

It is to be noted that the extreme positions of presentation of the half cones and of withdrawal of the slide need not be adjusted precisely since the placing in position of the half cones takes place when the slide is withdrawn.

The entire is then moved laterally to equip the four remaining valves.

All the movements described above can be carried out automatically by means of hydraulic piston-cylinder units the drive of which is programmed in a management unit, assuring the succession of the operations and avoiding any improper movement.

I claim:

1. A device for automatically placing valves of an internal combustion engine by inserting half cones in a collar on a valve stem, said device capable of accommodating valves having one or more grooves, said valve stem being disposed on a vertical or inclined axis, wherein said device comprises:
   pushing means adapted to cooperate with the collar in order to compress a valve spring on the opposite side of the collar so as to expose said valve stem;
   a pair of jaws laterally displaceable along an axis perpendicular to said valve stem, said pair of jaws adapted to cause grasping of said half cones regardless of the inclination of the valve stem with respect to the vertical axis; and
   a central slide vertically displaceable between an extended and a retracted position, said central slide including means for controlling said lateral displacement of said jaws, a lower portion of said central slide adapted to maintain said half cones in a spread apart position.

2. A device according to claim 1, wherein each jaw is urged against outward lateral movement the force of a spring.

3. A device according to claim 1, wherein each jaw is slidingly mounted for said lateral displacement on two shafts, said shafts being substantially parallel to said displacement.

4. A device according to claim 3, wherein each jaw includes bearings for facilitating said lateral displacement on said two shafts.

5. A device according to claim 3, wherein said jaws, said central slide, and said pushing means are contained within a housing.

6. A device according to claim 5, wherein said housing is formed of a bottom and a cover symmetrical to said bottom, said bottom having two wings, each of said wings having two openings adapted to secure said two shafts.

7. A device according to claim 3, wherein said central slide includes oblong openings to accommodate said two shafts.

8. A device according to claim 6, wherein each jaw further comprises a lever pivotally attached at a lower portion thereof, each of said levers having means for grasping said half cone, said levers being urged towards each other by a spring.

9. A device according to claim 7, wherein said central slide includes another oblong opening to accommodate said spring.

10. A device according to claim 1, wherein each jaw further comprises a lever pivotally attached at a lower portion thereof, each of said levers having means for grasping said half cone.

11. A device according to claim 10, wherein said levers are urged towards each other by a spring.

12. A device according to claim 11, wherein said jaws, said central slide, and said pushing means are contained within a housing.

13. A device according to claim 12, wherein said housing is formed of a bottom and a cover symmetrical to said bottom, said bottom having two wings.

14. A device according to claim 13, wherein said bottom and said cover each have a central extension, said bottom, said cover, and each of said respective central extensions having openings therethrough to receive said pushing means.

15. A device according to claim 14, wherein said central slide pivots about a transverse pin, said pivoting enabling said valves to be placed regardless of the inclination of the valve stem with respect to the vertical axis, said transverse pin being rotatably secured in internal guide grooves provided on the inner face of each said central extension.

16. A device according to claim 14, wherein said pushing means comprises two cylindrical rods adapted to slide in said openings, each rod having a block at one end adapted to cooperate with said means for controlling lateral displacement and an arcuate part at the other end adapted to rest against said collar.

17. A device according to claim 14, wherein said device further comprises springs disposed about said cylindrical rods between each of said blocks and the bottom and cover respectively, said springs urging said pushing means in an upward direction.

18. A device according to claim 11, wherein said central slide pivots about a transverse pin, said pivoting enabling said valves to be placed regardless of the inclination of the valve stem with respect to the vertical axis.

19. A device according to claim 11, wherein said means for controlling said lateral displacement of said jaws comprises two portions of said central slide having different widths, said portions connected by an inclined surface, whereby upon vertical displacement of said central slide, a cylindrical body interposed between said jaws and said central slide moves between said two portions along said inclined surface, thereby displacing said jaws.

20. A device according to claim 11, wherein said lower portion of said central slide is formed of tines of a fork bordering a central cutout, said central cutout adapted to receive the valve stem.

21. A device according to claim 20, wherein said tines have a cutout on an outer portion thereof, said cutout adapted to cooperate with a central opening in said collar.

* * * * *